US010063551B2

(12) United States Patent
Fuller

(10) Patent No.: US 10,063,551 B2
(45) Date of Patent: *Aug. 28, 2018

(54) ADVANCED GATEWAY DEVICE

(71) Applicant: AT&T Intellectual Property I, L.P., Atlanta, GA (US)

(72) Inventor: Andrew C. Fuller, Greensboro, NC (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 249 days.

This patent is subject to a terminal disclaimer.

(21) Appl. No.: 14/461,647

(22) Filed: Aug. 18, 2014

(65) Prior Publication Data
US 2015/0007276 A1    Jan. 1, 2015

Related U.S. Application Data

(63) Continuation of application No. 12/837,764, filed on Jul. 16, 2010, now Pat. No. 8,812,685.

(51) Int. Cl.
*G06F 15/16* (2006.01)
*H04L 29/06* (2006.01)
(Continued)

(52) U.S. Cl.
CPC .............. *H04L 63/10* (2013.01); *H04L 12/00* (2013.01); *H04L 12/2834* (2013.01);
(Continued)

(58) Field of Classification Search
CPC ............. H04L 65/1013; H04L 65/1016; H04L 65/102
See application file for complete search history.

(56) References Cited

U.S. PATENT DOCUMENTS 8,289,980 B2 * 10/2012 Cagenius .......... H04L 29/12009
370/401
2004/0190468 A1    9/2004 Saijonmaa
(Continued)

OTHER PUBLICATIONS

U.S. Office Action dated Jul. 6, 2012 in U.S. Appl. No. 12/837,764.
(Continued)

*Primary Examiner* — Jason D Recek
(74) *Attorney, Agent, or Firm* — Hartman & Citrin LLC

(57) ABSTRACT

The present disclosure is directed to an advanced gateway device ("gateway") for enabling communications between devices operating on or in communication with a communications network. The gateway includes a universal integrated circuit card ("UICC"), a router for interfacing with a number of devices, a network interface for communicating with the communications network, and one or more applications for managing associated devices and communications between the devices and the communications network. The gateway is registered with the communications network by transmitting information generated by the UICC to the communications network. Devices communicating with the gateway can access services provided by components of the communications network, and remote devices can access the devices communicating with the gateway based upon a trust relationship established between the gateway and the communications network.

20 Claims, 4 Drawing Sheets

(51) Int. Cl.
  *H04L 12/00* (2006.01)
  *H04L 12/28* (2006.01)
  *H04W 12/06* (2009.01)
  *H04L 29/08* (2006.01)

(52) U.S. Cl.
  CPC ........ *H04L 63/0853* (2013.01); *H04L 65/102* (2013.01); *H04L 67/16* (2013.01); *H04W 12/06* (2013.01)

(56) References Cited

U.S. PATENT DOCUMENTS

| | | | |
|---|---|---|---|
| 2007/0208864 A1* | 9/2007 | Flynn | H04L 63/02 709/227 |
| 2009/0180614 A1 | 7/2009 | Rajagopal et al. | |
| 2009/0247120 A1* | 10/2009 | Heutschi | H04L 63/0853 455/406 |
| 2009/0293113 A1* | 11/2009 | Foti | H04L 67/24 726/12 |
| 2010/0071053 A1 | 3/2010 | Ansari et al. | |
| 2010/0241748 A1 | 9/2010 | Ansari et al. | |
| 2010/0263032 A1* | 10/2010 | Bhuyan | H04L 63/061 726/7 |
| 2010/0325248 A1* | 12/2010 | Camarillo Gonzalez | H04L 67/24 709/220 |
| 2011/0077051 A1* | 3/2011 | Brown | H04M 1/67 455/558 |
| 2011/0090901 A1* | 4/2011 | Baratz | H04L 29/12094 370/352 |
| 2011/0138432 A1* | 6/2011 | Mitra | H04N 21/443 725/109 |
| 2011/0219416 A1* | 9/2011 | Lindquist | H04L 65/1016 725/110 |
| 2011/0231491 A1* | 9/2011 | Hautakorpi | H04L 29/12094 709/204 |
| 2012/0143976 A1* | 6/2012 | Lindquist | H04N 21/4882 709/206 |

OTHER PUBLICATIONS

U.S. Office Action dated Jan. 14, 2013 in U.S. Appl. No. 12/837,764.
U.S. Notice of Allowance dated Apr. 3, 2014 in U.S. Appl. No. 12/837,764.

* cited by examiner

ADVANCED GATEWAY DEVICE

CROSS-REFERENCE TO RELATED APPLICATIONS

This application is a continuation of U.S. patent application Ser. No. 12/837,764, filed Jul. 16, 2010, now U.S. Pat. No. 8,812,685, which is incorporated by reference herein in its entirety.

BACKGROUND

This application relates generally to gateway devices. More specifically, the disclosure provided herein relates to an advanced gateway device and methods for using and accessing devices and services via the advanced gateway device.

The proliferation of electronic and communication-enabled devices has presented new opportunities and new challenges for users. Many devices are specially designed to communicate with proprietary networks, servers, portals, or nodes to provide various services or functionality. Each electronic device in a home, office, or other location may communicate using varied protocols or standards that are incompatible with other devices in the home, office, or other location.

Similarly, some communications to or from a location may be blocked by firewalls, filters designed to block unsolicited bulk emails ("UBE"), also known as spam filters, and the like. Configuration of these firewalls, filters, and/or other devices may require considerable expertise. Furthermore, some electronic devices may generate communications in protocols or standards that are incompatible with other devices or infrastructure at a particular location. Thus, some communications-enabled devices may be unable to communicate with networks or devices due to software, hardware, or infrastructure limitations at a particular location.

SUMMARY

The present disclosure is directed to an advanced gateway device ("gateway") for enabling communications between devices operating on or in communication with a communications network. The gateway includes a universal integrated circuit card ("UICC"), a router for interfacing with a number of devices, a network interface for communicating with the communications network, and one or more applications for managing associated devices and communications between the devices and the communications network. The gateway is registered with the communications network by transmitting information generated by the UICC to the communications network. Thus, a trust relationship can be established between the gateway and the communications network.

The devices can be associated with the gateway using one or more applications executing on the gateway. The associated devices can be accessed remotely by one or more devices associated with the gateway or authenticated with the gateway or another trusted network node. One or more services or applications running on the communications network can be associated with the gateway or devices connected thereto. Thus, applications or services provided by the communications network can be provisioned to devices operating in a home, office, or other location in which a gateway is operating. Additionally, one or more devices operating on the gateway can be accessed remotely, via the gateway, to allow review of device operations, access to device functionality, control of the devices, and for other purposes.

According to an aspect, a computer-implemented method for managing communications between a device and a communications network includes computer-implemented operations for associating the device with a gateway. The gateway includes a universal integrated circuit card having a subscriber identity module executable for authenticating the gateway with the communications network. The method also includes registering the gateway with the communications network, receiving a request to conduct communications via the gateway, determining if an entity associated with the request is authorized to conduct the communications, and taking an action in response to the determining.

In some embodiments, registering the gateway with the communications network includes transmitting data generated by the UICC to the communications network. The data generated by the UICC includes unique information identifying the gateway as a device that is authorized to register on the communications network. In some embodiments, the gateway further includes a router for communicating with the device. The router is configured to communicate with the device using a wireless protocol, and the device is configured to communicate with the router using the wireless protocol. In some implementations, the gateway includes a transceiver configured to communicate wirelessly with the communications network using a cellular communications protocol. The gateway also includes, in some embodiments, a network interface configured to communicate with the communications network via a wired link with the communications network.

In some embodiments, receiving the request to conduct the communications via the gateway includes receiving a request from the device to access a component of the communications network. The component of the communications network can include an Internet Protocol Multimedia Subsystem ("IMS") of the communications network. In some embodiments, taking the action includes initiating a session initiation protocol ("SIP") session between the gateway and the IMS to authenticate the gateway to access an IMS application provided by the IMS. The device can be configured to utilize the IMS application, and the method further can include allowing the device to access and utilize the IMS application.

According to some implementations, receiving the request to conduct the communications via the gateway includes receiving a request from a remote device operating in communication with the network. The request includes a request to access the device associated with the gateway. According to one embodiment, the remote device is a smartphone associated with the gateway, the remote device is registered to communicate via the communications network, and the remote device is authorized to access the IMS. Determining that the entity is authorized to conduct the communications can include determining that subscriber information of the remote device is associated with subscriber information generated by the UICC of the gateway.

According to another aspect, a computer-readable storage medium has computer readable instructions stored thereupon that, when executed by a computer, cause the computer to associate a device with a gateway. The gateway includes a universal integrated circuit card ("UICC") having a subscriber identity module executable for authenticating the gateway with a communications network. The instructions further are executable to cause the computer to register the gateway with the communications network. Registering the gateway includes transmitting data generated by the UICC to the communications network, and the data generated by the UICC includes unique information identifying the gateway as a device that is authorized to communicate via the communications network. The instructions also can include instructions that are executable by the computer to cause the computer to receive a request to conduct communications via the gateway, to determine if an entity associated with the request is authorized to conduct the communications via the gateway, and to take an action in response to the determining.

According to some embodiments, the gateway further includes a router configured to communicate with the device using a wireless protocol and a transceiver configured to communicate wirelessly with the communications network using a cellular protocol. The device also is configured to communicate with the router using the wireless protocol. Receiving the request to conduct the communications via the gateway includes receiving a request from the device to access a component of the communications network. The component of the communications network includes, in some implementations, an Internet Protocol Multimedia Subsystem ("IMS") of the communications network. Taking the action can include initiating a session initiation protocol ("SIP") session between the gateway and the IMS to authenticate the gateway to access an IMS application provided by the IMS.

In some embodiments, receiving the request to conduct the communications via the gateway includes receiving a request from a remote device operating in communication with the network. The request received from the remote device includes a request to access the device associated with the gateway. The remote device can include a smartphone associated with the gateway, can be registered to communicate via the communications network, and can be authorized to access the IMS. Determining that the entity is authorized to conduct the communications can include determining that subscriber information of the remote device is associated with subscriber information generated by the UICC of the gateway.

According to yet another aspect, an advanced gateway device for managing communications between a device and a communications network is disclosed. The gateway includes a universal integrated circuit card ("UICC"), a cellular transceiver, and a processor configured to execute computer-readable instructions stored on a mass storage device. The instructions, when executed by the processor, cause the advanced gateway device to associate a device with a gateway, wherein the UICC of the gateway has a subscriber identity module executable for authenticating the gateway with a communications network. The instructions further can be executable to register the gateway with the communications network. Registering the gateway includes transmitting data generated by the UICC to the communications network. The data generated by the UICC includes unique information identifying the gateway as a device that is authorized to communicate via the communications network. The instructions further can be executable to receive a request to conduct communications via the gateway, and to determine if an entity associated with the request is authorized to conduct the communications via the gateway. Determining that the entity is authorized to conduct the communications includes determining that subscriber information associated with the entity corresponds to subscriber information associated with subscriber information generated by the UICC of the gateway. In response to the determining, communications with the entity can be allowed or denied.

In some embodiments, the advanced gateway device further includes a router configured to communicate with the device using a wireless protocol. The device can be configured to communicate with the router using the same wireless protocol, if desired. The advanced gateway device further can include a transceiver configured to communicate wirelessly with the communications network using a cellular protocol.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure, and be protected by the accompanying claims.

DETAILED DESCRIPTION

The following detailed description is directed to an advanced gateway device and methods, systems, and computer-readable media for using and accessing an advanced gateway device. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
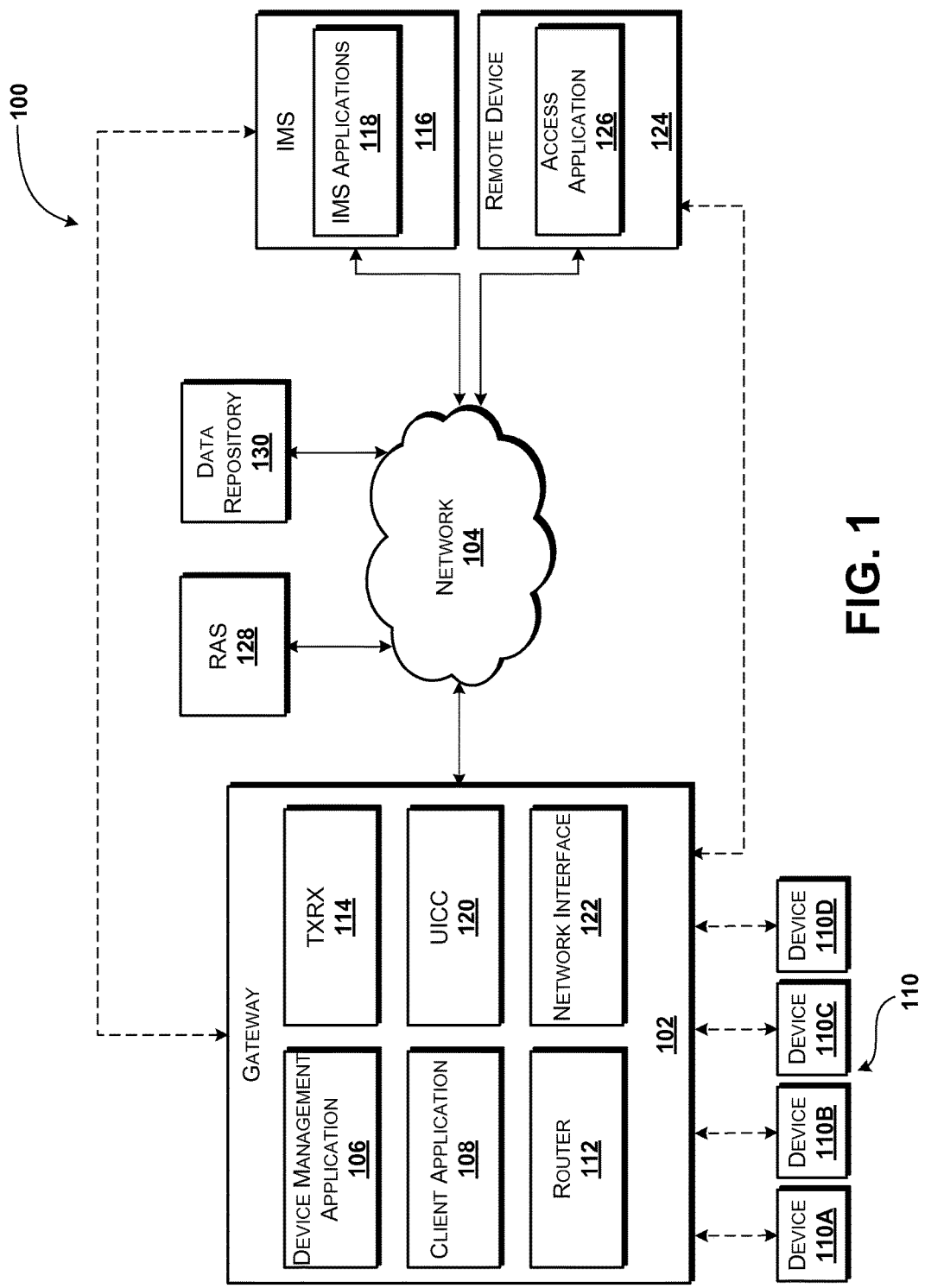
FIG. 1 is a system diagram schematically illustrating an example operating environment for various embodiments disclosed herein.

Referring now to FIG. 1, aspects of an operating environment 100 for the various embodiments presented herein will be described. The operating environment 100 shown in FIG. 1 includes an advanced gateway device 102 ("gateway") operating on or in communication with a communications network 104 ("network"). The network 104 can include one or more communications networks including, but not limited to, cellular networks, packet data networks, and/or public switched telephone networks. These and other aspects of an exemplary embodiment of the network 104 are described below with reference to FIG. 3.

The gateway 102 is configured to execute an operating system (not illustrated) and one or more application programs including, but not limited to, a device management application 106 and a client application 108. The operating system is a computer program for controlling the operation of the gateway 102. Examples of operating systems include, but are not limited to, WINDOWS, WINDOWS CE, WINDOWS MOBILE, and WINDOWS PHONE 7, from MICROSOFT CORPORATION, LINUX, SYMBIAN from SYMBIAN LIMITED, BREW from QUALCOMM CORPORATION, MAC OS and iOS from APPLE CORPORATION, and FREEBSD operating system. The device management application 106 and the client application 108 are executable programs configured to execute on top of the operating system to provide the functionality described herein.

The device management application 106 is configured to manage registration and communications with one or more devices 110A, 110B, 110C, and 110D (hereinafter collectively referred to as "devices 110") configured to communicate with the gateway 102. The devices 110 can include, but are not limited to, alarm systems, thermostats, appliances, computers, mobile computing devices, telephones, smartphones, automobiles, set-top boxes ("STB's"), set-top units ("STU's"), game consoles, telephone systems, digital video recording ("DVR") units, televisions and displays, energy management systems and devices, surveillance systems, and/or other devices configured to communicate with the gateway 102. As will be explained in more detail herein, the gateway 102 is configured to communicate with any device 110, and almost any device 110 can be configured to communicate with the gateway 102.

In some embodiments, the devices 110 communicate with the gateway 102 using one or more wired technologies. According to various exemplary embodiments, the gateway 102 and the device 110 communicate via point-to-point, multipoint, and broadcast links. The links can be provided by various hardware including, but not limited to, Ethernet ports and cables, universal serial bus ("USB") ports and cables, telephone cables such as unshielded, shielded, and screened twisted pair ("UTP," "STP," "S-UTP," "S-STP," and the like), fiber channel ports and cable, coaxial connectors and cables, combinations thereof, and the like.

In some embodiments, the devices 110 are configured to communicate with the gateway 102 using various wireless protocols and technologies. Exemplary wireless standards include, but are not limited to, the IEEE 802.11x standards ("WIFI"), IEEE 802.16 ("WIMAX"), IEEE 802.20 ("MBWA"), IEEE 802.16E ("Mobile WIMAX"), IEEE 802.15.x standards ("BLUETOOTH"), infrared signals ("IrDA"), ECMA-342 and ECMS 352 standards ("NFC"), other RF signals, combinations thereof, and the like. Thus, the device 110 can connect to the gateway 102 via wireless signal transmitters, receivers, and/or transceivers operating in accordance with various protocols and/or standards. It should be understood that the above-mentioned wired and wireless communication protocols and standards are exemplary, and that the gateway 102 and the devices 110 can be configured to communicate using almost any wired or wireless protocols, standards, and/or hardware.

The device management application 106 is configured to discover and/or register devices 110 for communications with the gateway 102. In some embodiments, the gateway 102 includes a router 112. The router 112 can include hardware and software for providing functionality that, in exemplary embodiments, is substantially similar to a WIFI router, with which the devices 110 communicate via WIFI signals. The router 112 also can include hardware and software for providing non-wireless router functionality. In some embodiments, the gateway 102 includes a transceiver 114 ("TXRX") for communicating with the devices 110 and/or the network 104. The transceiver 114 can include WIFI transceivers, BLUETOOTH transceivers, IrDA transceivers, RFID/NFC transceivers, WIMAX transceivers, and cellular transceivers. According to some embodiments, the gateway 102 includes two or more transceivers 114 configured to communicate using one or more communication protocols. As such, the illustrated embodiment, wherein the gateway 102 includes one transceiver 114, is illustrative, and should not be construed as being limiting in any way.

Exemplary cellular protocols include, but are not limited to Global System for Mobile communications ("GSM") and code division multiple access "CDMA"). These and other protocols, and variations thereof, can be used by the gateway 102 to communicate with one or more devices 110 and/or cellular networks. As will be described in more detail below with reference to FIG. 3, the cellular networks can be configured in accordance with various standards and/or protocols including, but not limited to, second generation ("2G") GSM, General Packet Radio Service ("GPRS") and/or Enhanced Data rates for GSM Evolution ("EDGE") standards, 3G Universal Mobile Telecommunications System ("UMTS"), High-Speed Packet Access ("HSPA"), e.g., the High-Speed Downlink Packet Access ("HSDPA"), Enhanced Uplink ("EUL")/High-Speed Uplink Packet Access ("HSUPA"), and/or the Evolved HSPA ("HSPA+"). The transceiver 114 also can be configured to communicate with fourth generation ("4G") and pre-4G networks, such as networks configured in accordance with Long Term Evolution ("LTE"), WIMAX, and other standards, as well as future and evolving communications standards and/or protocols.

The device management application 106 is configured to discover, register, and/or manage the devices 110, which can communicate with the gateway 102 via wired and/or wireless technologies. The client application 108 is configured to manage communications with the network 104, which can occur via wireless communications using the transceiver 114, and/or via wired connections, as discussed herein. Thus, as explained above, the client application 108 can communicate with the network 104 and/or components thereof using various standards, protocols, and/or hardware including, but not limited to, the wired and wireless technologies discussed above with respect to the connections between the devices 110 and the gateway 102.

In some embodiments, the gateway 102 is configured to communicate with an Internet Protocol Multimedia Subsystem 116 ("IMS") of the network 104, and to access various services and/or applications provided by or in conjunction with the IMS 116. The device management application 106 and/or the client application 108 can be configured to associate the devices 110 with services on the network 104, the IMS 116, and/or the IMS applications 118. For example, a mobile phone operated by the user can be associated with the gateway 102 and a cellular telephone service provided by the network 104. A user can configure the gateway 102 to communicate with the network 104 when the mobile phone enters or leaves the range of the gateway 102. In response to the notification, the network 104 can activate/deactivate a forwarding number, enable/disable cellular access, enable/disable VoIP functionality via the IMS 116, and/or take other actions. Similarly, a security system, thermostat, or other device can be associated with services provided by the IMS 116, the IMS applications 118, and/or elsewhere on the network 104. It should be understood that these embodiments are exemplary.

While the IMS 116 is not described or illustrated herein in detail, it should be appreciated that the IMS 116 can include multiple layers of functionality including, but not limited to, one or more access layers, one or more transport layers, one or more application layers, and the like. Other functions such as charging, authentication, provisioning, access control, and the like are provided by various components of the IMS 116 that are not illustrated in FIG. 1. According to various embodiments, the client application 108 of the gateway 102 is configured to authenticate with the IMS 116, and access one or more IMS applications 118 provided or managed by the IMS 116. The IMS applications 118 can be provided or managed by third party service providers such as game companies, video companies, alarm services companies, media services companies, and the like, or can be provided and/or managed by an operator or carrier associated with the network 104 and/or the IMS 116. These and other functions of the gateway 102 are described in more detail below with reference to FIG. 2.

The IMS 116 can be configured to support network address translation (NAT) traversal. As such, network sessions and/or IMS services provided during the network sessions can be traversed from an authorized computer, including a PC, laptop, PDA, mobile phone, server, or other device, to the gateway 102 using NAT traversal without undertaking special configuration of the gateway 102 and/or the router 112. It should be understood that in some embodiments, the router 112 includes the functionality of a NAT WIFI router. Similarly, applications running on smartphones or other mobile devices associated with the gateway 102, applications running on or in conjunction with the IMS 116 or IMS applications 118, and/or any application on the Internet or elsewhere on the network 104 that has been authorized by the IMS 116, can access the devices 110 through the IMS 116 using NAT traversal. These and other applications or services can be tailored by the operator of the network 104 or third party vendors to exploit the abilities of the gateway 102.

The gateway 102 also includes hardware for authenticating with the network 104. In the illustrated embodiment, the gateway 102 includes an authentication device 120. The authentication device 120 can include one or more of a subscriber identity module ("SIM"), a Universal Integrated Circuit Card ("UICC"), and/or other authentication hardware and/or software (referred to herein as a "UICC 120"). The UICC 120 includes one or more applications that are executable by the UICC 120 and/or other components of the gateway 102 to enable the gateway 102 to authenticate with the network 104. According to various embodiments, the functionality of the UICC 120 can be provided by a CDMA-SIM ("CSIM"), a Universal-SIM ("USIM"), an IP Multimedia Services Identity Module ("ISIM"), a Removable User Identity Module ("RUIM"), a WILLCOM-SIM ("W-SIM"), other devices, combinations thereof, and the like. It should be understood that the functionality of the UICC 120 also can be provided by a micro-SIM, a mini-SIM, a smart card, and/or other hardware and software modules. Therefore, for purposes of the claims, the phrase "universal integrated circuit card" is used expansively to include UICC's, SIM's, CSIM's, USIM's, ISIM's, RUIM's, W-SIM's, and the like, in full or compact sizes. In some embodiments, the functionality of the UICC 120 is provided by a non-removable SIM card. It should be understood that the UICC 120 includes, in some embodiments, an ISIM application that runs on the UICC 120. The ISIM can be executed for authenticating the UICC 120, and thereby the gateway 102, with the IMS 116.

The gateway 102 also includes a network interface 122 for communicating with the network 104 and/or other devices and/or networks. According to various implementations, the network interface 122 supports communications with the network 104 via wired and/or wireless communications. Thus, it will be appreciated that the functionality of the network interface 122 can be provided by one or more wireline or wireless interfaces including, but not limited to, USB ports, mini-USB ports, IEEE 1394 ("FIREWIRE") ports, serial ports, parallel ports, RJ48 ("Ethernet") ports, RJ11 ("telephone") jacks, coaxial connectors, the router 112, the transceiver 114, combinations thereof, and the like.

In some embodiments, the operating environment 100 includes one or more remote devices 124 operating on or in communication with the network 104. According to various embodiments, the remote device 124 include one or more smartphones, mobile telephones, personal digital assistants ("PDAs"), desktop computers, server computers, laptop computers, tablet computers, and/or other fixed and mobile computing or communication devices. In the illustrated embodiment, the functionality of the remote device 124 is provided by a cellular telephone configured to communicate with the network 104. For purposes of illustrating the concepts and technologies described herein, the remote device 124 is described as a mobile device belonging to an owner or other authorized entity associated with the gateway 102. It will be appreciated that in some embodiments, an authorized entity associates his or her mobile device with the gateway 102, for example via the device management application 106.

Although not illustrated in FIG. 1, the remote device 124 includes hardware and/or software for authenticating the remote device 124 on with the network 104. In the illustrated embodiment, the remote device 124 includes an authentication device for authenticating with the network 104. The authentication device of the remote device 124 can be substantially similar to the UICC 120 of the gateway 102. In some implementations, the UICC 120 and the authentication device of the remote device 124 are issued by the same carrier or other vendor, although this is not necessarily the case.

As explained above with respect to the UICC 120, the functionality of the authentication device of the remote device 124 can be provided by one or more of a SIM, a UICC, a CSIM, a USIM, an ISIM, a RUIM, a W-SIM, combinations thereof, and the like. Additional and/or alternative hardware and software modules can be used, if desired. The remote device 124 can connect to the network 104, and can communicate with one or more nodes of the network 104 to authenticate itself and register with the network 104. According to various embodiments, the remote device 124 transmits data generated by the authentication device to a registration node of the network 104, and upon successful authentication, is registered on the network 104. According to some embodiments, the registration node of the network 104 includes an HSS, an HLR, or another device or node of the network 104.

As will be explained in more detail with reference to FIG. 2, the remote device 124 also can remotely connect to the gateway 102. The remote device 124 can authenticate with the IMS 116. For example, a user of the gateway 102 can associate a public user ID on the remote device 124 with the gateway 102, for example by way of the device management application 106. The network 104 and/or the IMS 116 can connect the remote device 124 to the gateway 102, and can allow the remote device 124 to traverse the NAT based upon the public user ID on the remote device 124. Access to the gateway 102, the devices 110, and/or applications or services running on the gateway 102 can be granted to the remote device 124 if the remote device 124 successfully authenticates with the network 104 and the IMS 116.

The remote device 124 executes an operating system (not illustrated) and one or more application programs including, but not limited to, an access application 126. As will be described in more detail with reference to FIG. 2, the access application 126 is configured to access the gateway 102, the network 104, the IMS 116, and/or one or more devices 110 communicating with the gateway 102. According to various implementations, the remote device 124 does not need any special application for accessing the gateway 102, as any IMS-capable device can access the gateway 102 via the IMS 116. Thus, the functionality of the access application 126 can be provided by a web browser or other application, and need not be specially configured to access the gateway 102 and/or other networks or devices.

In some embodiments, the authentication device of the remote device 124 and the UICC 120 of the gateway 102 are associated with one another and data relating to the association is stored on the network 104 instead of, or in addition to, the association made at the gateway 102, as described above. This association can be made by a network operator, a user, and/or another authorized entity or device such as a remote access server 128 ("RAS"). The RAS 128 can configure and store permissions data indicating the association on the network 104, for example in a data repository 130. According to various embodiments, the functionality of the data repository 130 is provided by a server, a database, a memory device, and/or another data storage location. Although the RAS 128 is illustrated as residing on the network 104, it should be understood that the functionality of the RAS 128 can be provided by one or more of the IMS applications 118. Thus, the RAS 128 can perform NAT traversal for the remote device 124 accessing the gateway 102.

In some embodiments, access between the remote device 124 and the gateway 102 is filtered or managed by the RAS 128 instead of, or in addition to, the gateway 102. Upon receipt of a request from the remote device 124 to access the gateway 102, the RAS 128 can access the permissions data to determine if the remote device 124 is entitled to access the gateway 102. Thus, if a remote device 124 is not authorized to access the gateway 102, the RAS 128 can disallow communications between the remote device 124 and the gateway 102. If the remote device 124 is authorized to access the gateway 102, the RAS 128 can allow the communications between the remote device 124 and the gateway 102. It should be understood that this embodiment is exemplary, and should not be construed as being limiting in any way.

FIG. 1 illustrates one gateway 102, one network 104, one IMS 116, one remote device 124, one RAS 128, and one data repository 130. It should be understood, however, that some implementations of the operating environment 100 include multiple gateways 102, multiple networks 104, multiple IMS's 116, multiple remote devices 124, multiple RAS's 128, and/or multiple data repositories 130. Therefore, the illustrated embodiment should be understood as being exemplary, and should not be construed as being limiting in any way.

Figure 2:
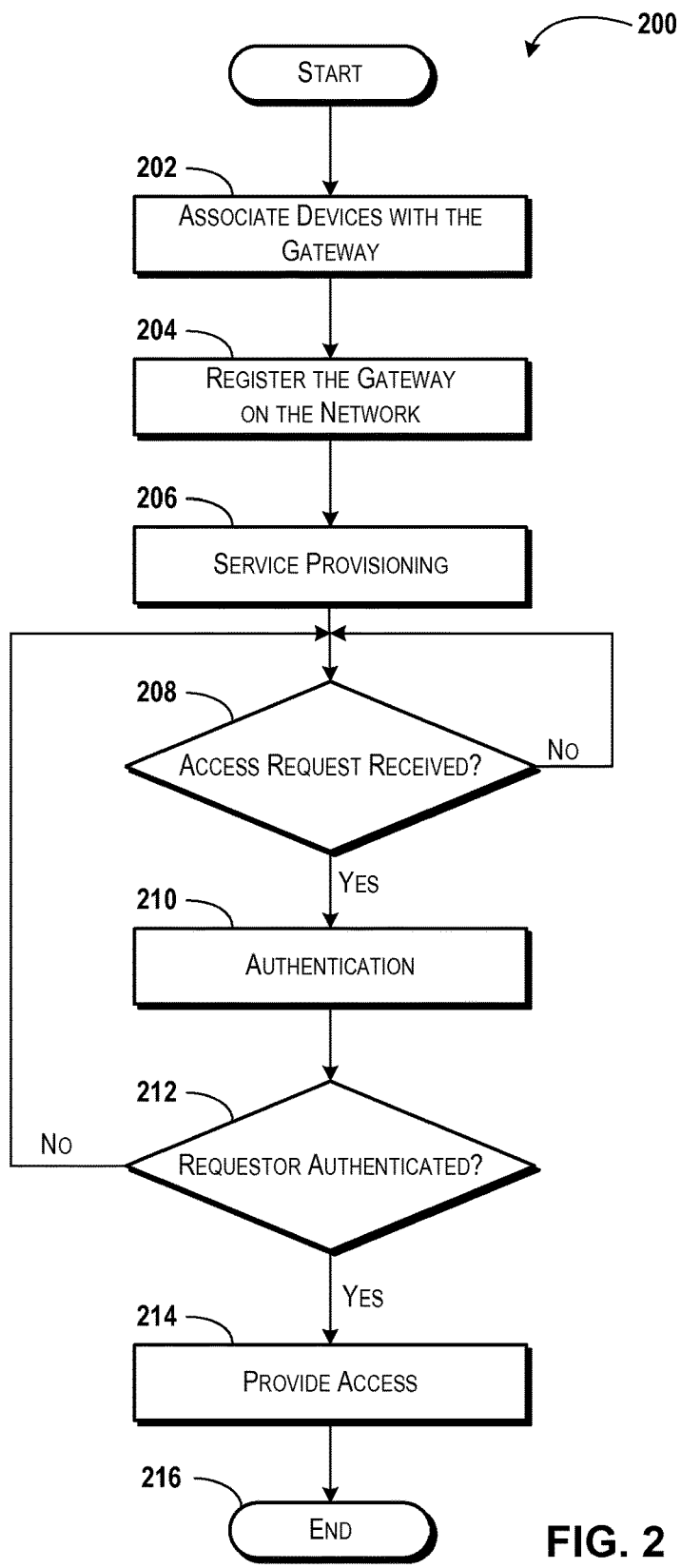
FIG. 2 is a flow diagram showing aspects of a method for using a gateway, according to an example embodiment.

Turning now to FIG. 2, aspects of a method 200 for using the gateway 102 will be described in detail, according to an exemplary embodiment. It should be understood that the operations of the method 200 are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 200 can be ended at any time and need not be performed in its entirety. Some or all operations of the method 200, and/or substantially equivalent operations, can be performed by execution of computer-readable instructions included on a computer-storage media, as defined above. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof.

For purposes of illustrating and describing the concepts of the present disclosure, the method 200 is described as being performed by the gateway 102. It should be understood that this embodiment is exemplary, and should not be viewed as being limiting in any way. The method 200 begins at operation 202, wherein one or more devices 110 are associated with a gateway 102. As explained above, the devices 110 can include almost any type of device that is configured to communicate with the gateway.

In various embodiments, the devices 110 include alarm systems, thermostats, STU's, STB's, DVR units, appliances, computers, telephones, mobile devices, and/or combinations thereof. Each of the devices 110 can be configured to communicate with the gateway 102 via wired and/or wireless technologies. In one embodiment, the devices 110 are configured for wireless communications with the gateway 102 using BLUETOOTH, WIFI, and/or other wireless protocols. The devices 110 are activated, and the device management application 106 is accessed by a user of the gateway 102 to see all activated devices 110 in range of the gateway 102. According to various embodiments, the device 110 can be activated in a "discover mode," discovered by the gateway 102, and registered with the gateway 102 using the device management application 106. It will be appreciated that registration of the devices 110 with the gateway 102 can be restricted by requiring entry of an access code, a password, and/or other information, if desired. In the described embodiment, a mobile telephone also is associated with the gateway 102, and is used thereafter as the remote device 124.

Once registered with the gateway 102, various functionality of the devices 110 can be accessed via the gateway 102. For example, an entity can access the devices 110 using the device management application 106. Additionally, or alternatively, the entity can access the devices 110 via remote access using the remote device 124, a web browser, and/or other devices. Remote access of the devices 110 can be restricted to entities and/or devices that have successfully authenticated with the network 104 and/or the gateway 102. Thus, for example, a user of an authenticated device can access alarm functions of an alarm system registered with the gateway 102, and can control activation or deactivation of the alarm system, as well as controlling other functionality. This example is illustrative, and should not be construed as being limiting in any way.

Furthermore, the devices 110 can access applications and/or services operating on the network 104 via the gateway 102. Devices 110 that are associated with the gateway 102 can be allowed to access the network 104 and/or components thereof. In some embodiments, the devices 110 access the IMS 116, and/or one or more services or applications provided thereby such as the IMS applications 118. Although not illustrated or described herein in detail, it should be understood that in some embodiments the devices 110 are authenticated by the gateway 102, and the gateway 102 authenticates with the IMS 116 before accessing the IMS applications 118. Authentication or authorization of the devices 110 can include reviewing a list of devices 110 associated with the gateway 102, recognition of a trust relationship, or other methods, some of which are mentioned above. Similarly, it should be understood that authentication of the gateway 102 with the IMS 116 can include initiation of a session with the IMS 116, for example using the session initiation protocol ("SIP") or other suitable communications. Because the gateway 102 is registered on the network 104 by virtue of the UICC 120, the IMS 116 recognizes, in some embodiments, a trust relationship with the gateway 102. Thus, some embodiments allow the gateway 102 to access the IMS 116 without submitting additional digital certificates, passwords, logins, and the like, or requiring new passwords for the devices 110.

From the perspective of the IMS 116, the gateway 102 attaches to the network 104 and/or to the IMS 116 as a registered communication device. Communications between the devices 110 and the IMS 116 are managed by the gateway 102. As such, the IMS 116 and/or the network 104 do not authenticate each device 110 associated with the gateway 102. The gateway 102 registers with the network 104, manages authentication and/or session control functions with the network 104 and/or components thereof such as the IMS 116, and thereby enables the devices 110 to access to the network 104 and/or the IMS 116.

From operation 202, the method 200 proceeds to operation 204, wherein the gateway 102 registers with the network 104 and/or a component thereof such as the IMS 116. In some embodiments, the network 104 includes a cellular network. As such, operation 204 can include the gateway 102 activating a wireless transceiver such as the transceiver 114 of the gateway 102, and communicating with one or more nodes of the network 104 to transmit information generated by the UICC 120 with the network 104 and/or a component thereof. It should be understood that the gateway 102 can register on the network 104 using wireless communications, but can provide all other communications via wireline, satellite, and/or other communications hardware, if desired.

From operation 204, the method 200 proceeds to operation 206, wherein the authenticated gateway 102 is provisioned with services. According to various embodiments, the operation 206 can include a node or device on the network 104 reviewing a subscription, communications plan, and the like associated with the gateway 102, and provisioning of services associated with the gateway 102. Operation 206 also can include the gateway 102 requesting services or applications on the network 104, review of permissions associated with the gateway 102, and provisioning of the services to the gateway 102 if the gateway 102 is authorized to access your services. Although not illustrated in FIG. 1 or 2, it should be understood that the network 104 and/or the IMS 116 can include charging and/or billing modules for tracking, charging, and/or billing an entity for accessing the network 104 and/or the IMS 116. Additionally, it should be understood that the provisioned services can include allowing access to one or more of the IMS applications 118.

From operation 206, the method 200 proceeds to operation 208, wherein the gateway 102 determines if any users or devices 110 have accessed the gateway 102. As explained above, the gateway 102 can be accessed by the devices 110 to access services on the network 104, by devices or nodes on the network 104 attempting to access the gateway 102 and/or the devices 110, by a remote device 124 attempting to access the gateway 102 and/or the devices 110, or by other hardware and software operating on or in communication with the network 104. In another embodiment, a user accesses the gateway 102 via a web portal or web-based access mechanism that can be accessed with a web browser, a stand-alone application, a mobile web browser, and the like.

At operation 210, authentication of the requestor is attempted. It should be understood that authentication of the user can be handled by the gateway 102, the IMS 116, the RAS 128, and/or other nodes or devices on or in communication with the gateway 102 or the network 104. If the gateway 102 determines that an entity such as a user, network device, network node, the devices 110, the IMS 116, an IMS application 118, or the remote device 124 has accessed the gateway 102 or one or more services provided thereby, the method 200 proceeds to operation 210, wherein the entity requesting access to or via the gateway 102 is authenticated, if necessary.

From operation 210, the method 200 proceeds to operation 212, wherein the gateway 102 determines if the requestor was authenticated with the gateway 102. If the gateway 102 determines that the requestor was not authenticated successfully, the method 200 returns to operation 208, wherein the gateway 102 again determines if an access request has been received. As explained above, it will be appreciated that the method 200 can terminate at any time, even if no access request from a successfully authenticated entity has been received.

If the gateway 102 determines at operation 212 that the requestor authenticated successfully, the method 200 proceeds to operation 214, wherein the gateway 102 grants the requestor access to the gateway 102, to the devices 110, to the network 104, and/or to a device or node operating on or in communication with the network 104. Thus, it should be understood that a requestor, upon authentication, can be granted access to the gateway 102 and/or to devices 110 associated therewith. Additionally, a requestor, upon authentication, can be granted access to one or more applications, services, nodes, devices, or networks if the requestor is a device attempting to access services via the gateway 102. As explained above, authentication can be handled by the gateway 102, the network 104, the IMS 116, the RAS 128, and/or other entities, if desired. It also should be understood that authentication may not be required if the device accessing the gateway 102, or attempting to access services on the network 104 via the gateway 102, is recognized by the gateway 102 as an associated device 110 or remote device 124. The method 200 ends at operation 216.

It will be appreciated that the gateway 102 can provide connectivity between the devices 110 and the network 104. The gateway 102 also can be used to provide access to services or applications on the network 104 by the devices 110, and access to the devices 110 by other entities via the remote device 124 and/or web-based access, if desired. For example, in one embodiment, a user associates one or more mobile devices with the gateway 102. The mobile device can be associated with the gateway 102 via the device management application 106, if desired. The user can use the mobile device to access the gateway 102 remotely, as explained above with respect to the remote device 124. Additionally, the mobile device can authenticate with the IMS 116 via an authentication device such as the authentication device of the remote device 124 described above. Similarly, the gateway 102 can authenticate with the IMS 116 via the UICC 120. Thus, the mobile device and the gateway can share mutual trust between each other and the IMS 116, thereby allowing NAT traversal to the gateway 102.

In another embodiment, a user associates a computer or other device 110 with a banking service or other service that requires authentication. The computer can be configured to access the banking service via the gateway 102 and the IMS 116, thereby taking advantage of the trust relationship between the gateway 102 and the IMS 116 to obviate the typical authentication requirement, e.g., entry of an ID and password. It should be understood that such functionality can be provided by a vendor associated with the banking service, which can create an application or portal specifically designed to accommodate access via the gateway 102 and/or IMS 116. It should be understood that the trust relationship between the gateway 102 and the IMS 116 can be extended to all services occurring via the gateway 102 without requiring specifically designed devices, instead relying upon authentication and registration of the gateway 102 on the network 104 and/or the IMS 116.

In yet another embodiment, a user associates the devices 110 with the gateway 102, and associates one or more of the devices 110 with applications or services provided by the IMS 116. The IMS 116 can provide rich and highly secure interaction with the devices 110 without requiring complex configuration of the devices 110. Effectively, the gateway 102 can provide a firewall to the devices 110 that blocks any communication with the devices 110 unless the communications originate from a trusted device, program, or network such as, for example, the remote device 124 registered with the network 104, an authenticated session via a web browser, or the like. The above-described embodiments are exemplary and are provided to illustrate additional aspects of the disclosed concepts and technologies. Thus, these embodiments should not be construed as being limiting in any way.

Although not described above in detail, it should be understood that the functionality of the gateway 102 can be provided by almost any device that is configured to provide the functionality described above with respect to the gateway 102. In some embodiments, the functionality of the gateway 102 is provided by a smartphone with WIFI capabilities, wherein the smartphone executes one or more software modules for providing the functions the device management application 106 and the client device 108. Additionally, the smartphone can provide the functionality of the router 112 via a WIFI device and software on the smartphone, and a UICC of the smartphone can provide the functionality of the UICC 120. A radio transmitter, receiver, and/or transceiver of the smartphone can provide the functionality of the transceiver 114 and/or the network interface 122. Similarly, a laptop, desktop, or tablet computer can be configured as the gateway 102. These embodiments are exemplary, and should not be construed as being limiting in any way.

In various implementations, the gateway 102 is authenticated with the network 104 and/or the IMS 116, and the devices 110 connect to the network 104 and/or the IMS 116 via the gateway 102. Because the gateway 102 conducts all authentication with the network 104 and/or the IMS 116 via the UICC 120, the devices 110 that have been appropriately associated with the gateway 102 via the Device Management Application 106 are relieved from authentication with the network 104 and/or the IMS 116, instead relying upon the existing trust relationship between the gateway 102 and the network 104 and/or the IMS 116. Thus, embodiments of the gateway 102 allow for control of any device 110 that is configured for network communication, without providing additional hardware or software to accommodate communications with the network 104 and/or the IMS 116. The gateway 102 provides the connectivity between the devices 110 and the network 104 and/or the IMS 116, without the addition of specialized hardware and/or software that is specifically designed for communications with the network 104 and/or the IMS 116.

Figure 3:
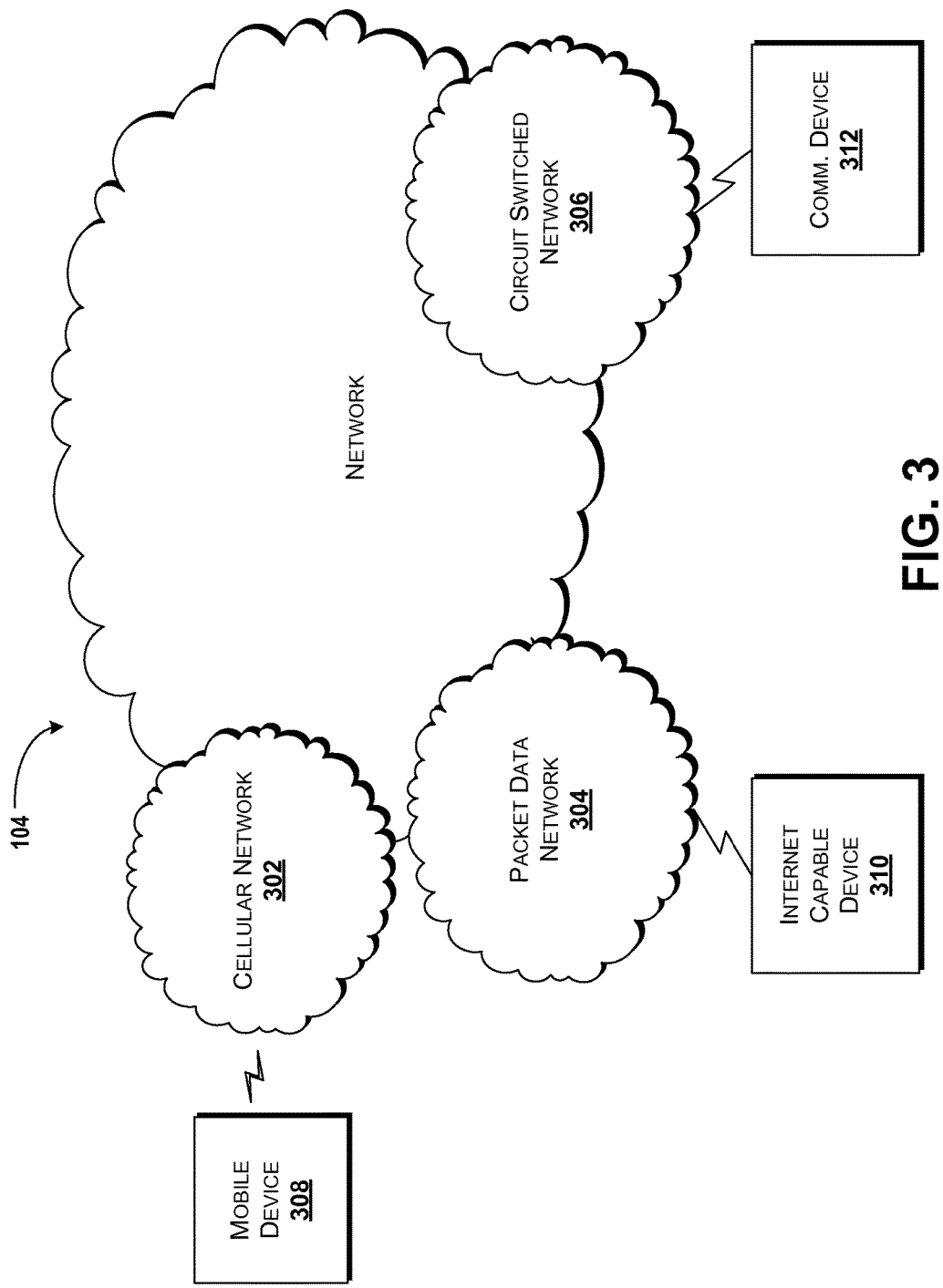
FIG. 3 schematically illustrates a network, according to an example embodiment.

Turning now to FIG. 3, additional details of the network 104 are illustrated, according to an exemplary embodiment. The network 104 includes a cellular network 302, a packet data network 304, for example, the Internet, and a circuit switched network 306, for example, a publicly switched telephone network ("PSTN"). The cellular network 302 includes various components such as, but not limited to, base transceiver stations ("BTS's"), Node-B's or e-Node-B's, base station controllers ("BSC's"), radio network controllers ("RNC's"), mobile switching centers ("MSC's"), mobile management entities ("MME's"), short message service centers ("SMSC's"), multimedia messaging service centers ("MMSC's"), home location registers ("HLR's"), home subscriber servers ("HSS's"), visitor location registers ("VLR's"), charging platforms, billing platforms, voicemail platforms, GPRS core network components, location service nodes, an IMS such as the IMS 116, and the like. The cellular network 302 also includes radios and nodes for receiving and transmitting voice, data, and combinations thereof to and from radio transceivers, networks, the packet data network 304, and the circuit switched network 306. As explained above with reference to FIGS. 1-2, the cellular network 302 also can include the IMS 116, though the IMS 116 is not illustrated in FIG. 3.

A mobile communications device 308, such as, for example, a cellular telephone, a user equipment, a mobile terminal, a PDA, a laptop computer, a handheld computer, and combinations thereof, can be operatively connected to the cellular network 302. Although not illustrated in FIG. 3, the gateway 102 and/or the remote device 124 also can communicate with the cellular network 302. As explained above with reference to FIG. 1, the cellular network 302 can be configured as a 2G GSM network and can provide data communications via GPRS and/or EDGE. Additionally, or alternatively, the cellular network 302 can be configured as a 3G UMTS network and can provide data communications via the HSPA protocol family, for example, HSDPA, EUL (also referred to as HSUPA), and HSPA+. The cellular network 302 also is compatible with 4G mobile communications standards as well as evolved and future mobile standards.

The packet data network 304 includes various devices, for example, servers, computers, databases, and other devices in communication with one another, as is generally known. The packet data network 304 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. The circuit switched network 306 includes various hardware and software for providing circuit switched communications. The circuit switched network 306 may include, or may be, what is often referred to as a plain old telephone system (POTS). The functionality of a circuit switched network 306 or other circuit-switched network are generally known and will not be described herein in detail.

The illustrated cellular network 302 is shown in communication with the packet data network 304 and a circuit switched network 306, though it should be appreciated that this is not necessarily the case. One or more Internet-capable devices 310, for example, a PC, a laptop, a portable device, the gateway 102, the remote device 124, a smartphone, or any other suitable device, can communicate with one or more cellular networks 302, and devices connected thereto, through the packet data network 304. It also should be appreciated that the Internet-capable device 310 can communicate with the packet data network 304 through the circuit switched network 306, the cellular network 302, and/or via other networks (not illustrated).

As illustrated, a communications device 312, for example, a telephone, facsimile machine, modem, computer, or the like, can be in communication with the circuit switched network 306, and therethrough to the packet data network 304 and/or the cellular network 302. It should be appreciated that the communications device 312 can be an Internet-capable device, and can be substantially similar to the Internet-capable device 310. In the specification, the network 104 is used to refer broadly to any combination of the networks 302, 304, 306. It should be appreciated that substantially all of the functionality described with reference to the network 104 can be performed by the cellular network 302, the packet data network 304, and/or the circuit switched network 306, alone or in combination with other networks, network elements, and the like.

Figure 4:
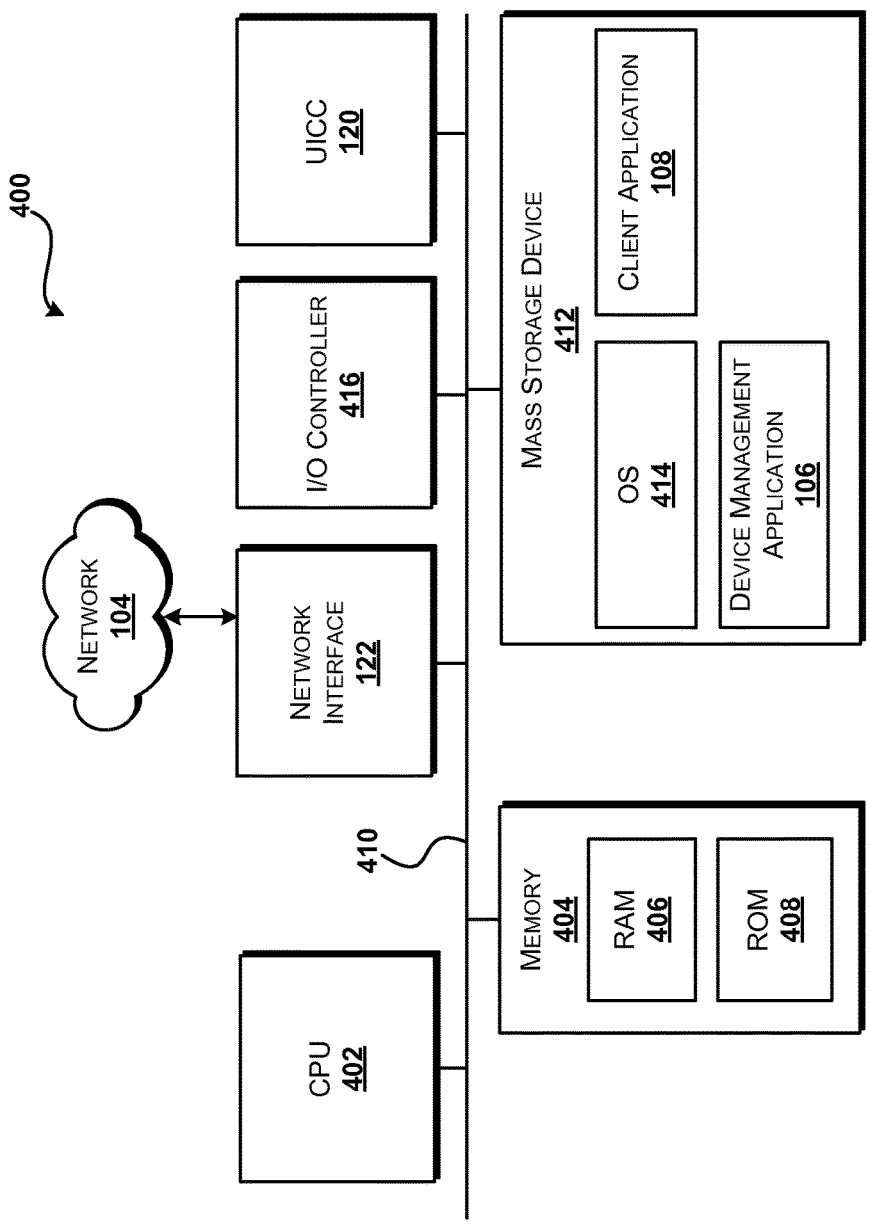
FIG. 4 is a computer architecture diagram illustrating an example computer hardware and software architecture for an advanced gateway device capable of implementing aspects of the embodiments presented herein.

FIG. 4 illustrates an example computer architecture 400 for the gateway 102 or other device capable of executing the software components described herein for enabling communications between the devices 110 and the network 104. Thus, the computer architecture 400 illustrated in FIG. 4 illustrates an architecture for the gateway 102 or another device, which can be embodied in one or more server computers, mobile phones, routers, PDAs, smartphones, desktop computers, netbook computers, tablet computers, and/or laptop computers. The computer architecture 400 may be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing the operating system 414, the device management application 106, and the client application 108. Although not illustrated, the mass storage device 412 also can be configured to store the permissions data, described above as being stored in the data repository 130.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media that can be accessed by the computer architecture 400.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes of this specification and the claims, the phrase "computer-readable storage medium" and variations thereof, does not include waves, signals, and/or other transitory and/or intangible communication media.

According to various embodiments, the computer architecture 400 may operate in a networked environment using logical connections to remote computers through a network such as the network 104. The computer architecture 400 may connect to the network 104 through the network interface 122 connected to the bus 410. As explained above in detail, the network interface 122 also may be utilized to connect to other types of networks and remote computer systems, for example, the devices 110, the IMS 116, the remote device 124, the RAS 128, and/or the data repository 130. The computer architecture 400 also may include an input/output controller 416 for receiving and processing input from a number of other devices, including a keyboard, mouse, touchscreen, or electronic stylus (not shown in FIG. 4). Similarly, the input/output controller 416 may provide output to a display screen, a printer, or other type of output device (also not shown in FIG. 4).

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. As explained above, the computer architecture 400 can include the UICC 120. It is also contemplated that the computer architecture 400 may not include all of the components shown in FIG. 4, may include other components that are not explicitly shown in FIG. 4, or may utilize an architecture completely different than that shown in FIG. 4.

Based on the foregoing, it should be appreciated that an advanced gateway device and technologies for managing communications between devices and networks have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

I claim:

1. A method comprising:
   registering, by a gateway comprising a processor and a universal integrated circuit card comprising a subscriber identity module, a device for communications with the gateway;
   executing, by the processor, the subscriber identity module to register the gateway with a communications network, wherein in response to registering, the gateway is provisioned with services by the communications network, and wherein the services comprise access to an internet protocol multimedia subsystem of the communications network;
   receiving, by the processor and from the device, a request to conduct communications via the gateway with an application that is provided by the internet protocol multimedia subsystem of the communications network;
   determining, by the processor, that the device is authorized to conduct the communications via the gateway; and
   enabling, by the processor, the communications with the communications network via the gateway, wherein enabling the communications comprises initiating a network session between the gateway and the internet protocol multimedia subsystem of the communications network to allow access to the application, wherein the device accesses the application via the network session.

2. The method of claim 1, wherein registering the gateway with the communications network comprises transmitting data generated by the universal integrated circuit card to the communications network, the data comprising information identifying the gateway as a device that is authorized to register on the communications network.

3. The method of claim 1, wherein the gateway further comprises a router that enables communications with the device.

4. The method of claim 3, wherein the router enables communications with the device using a wireless protocol, and wherein the device communicates with the router using the wireless protocol.

5. The method of claim 1, wherein the gateway further comprises a transceiver that communicates wirelessly with the communications network using a cellular communications protocol.

6. The method of claim 1, wherein the gateway further comprises a network interface that communicates with the communications network via a wired link with the communications network.

7. The method of claim 1, wherein the application comprises an internet protocol multimedia subsystem application.

8. The method of claim 1, wherein the network session comprises a session initiation protocol session.

9. The method of claim 7, wherein the device executes the internet protocol multimedia subsystem application via the communications, and wherein the communications are managed by the gateway.

10. The method of claim 1, further comprising receiving a further request from a remote device operating in communication with the communications network, the further request requesting access to the device associated with the gateway.

11. The method of claim 10, further comprising determining that subscriber information of the remote device is associated with subscriber information generated by the universal integrated circuit card of the gateway.

12. A computer-readable storage medium storing computer readable instructions that, when executed by a processor, cause the processor to perform operations comprising:
registering a device for communications with a gateway comprising a universal integrated circuit card, the universal integrated circuit card comprising a subscriber identity module;
executing the subscriber identity module to register the gateway with a communications network, wherein in response to registering, the gateway is provisioned with services by the communications network, and wherein the services comprise access to an internet protocol multimedia subsystem of the communications network;
receiving, from the device, a request to conduct communications via the gateway with an application that is provided by the internet protocol multimedia subsystem of the communications network;
determining that the device is authorized to conduct the communications via the gateway; and
enabling the communications with the communications network via the gateway, wherein enabling the communications comprises initiating a network session between the gateway and the internet protocol multimedia subsystem of the communications network to allow access to the application, wherein the device accesses the application via the network session.

13. The computer-readable storage medium of claim 12, wherein the gateway further comprises a router that communicates with the device using a wireless protocol and a transceiver that communicates wirelessly with the communications network using a cellular protocol, and wherein the device communicates with the router using the wireless protocol.

14. The computer-readable storage medium of claim 12, wherein the application comprises an internet protocol multimedia subsystem application.

15. The computer-readable storage medium of claim 12, wherein the network session comprises a session initiation protocol session.

16. The computer-readable storage medium of claim 12, wherein the computer readable instructions, when executed by the processor, cause the processor to perform operations further comprising:
receiving a further request from a remote device operating in communication with the communications network, the further request requesting access to the device associated with the gateway.

17. The computer-readable storage medium of claim 16, wherein the computer readable instructions, when executed by the processor, cause the processor to perform operations further comprising:
determining that subscriber information of the remote device is associated with subscriber information generated by the universal integrated circuit card of the gateway.

18. A gateway comprising:
a universal integrated circuit card;
a processor;
a cellular transceiver; and
a memory that stores computer-readable instructions that, when executed by the processor, cause the processor to perform operations comprising
registering a device for communications with the gateway, wherein the universal integrated circuit card comprises a subscriber identity module,
executing the subscriber identity module to register the gateway with a communications network, wherein in response to registering, the gateway is provisioned with services by the communications network, and wherein the services comprise access to an internet protocol multimedia subsystem of the communications network,
receiving, from the device, a request to conduct communications via the gateway with an application that is provided by the internet protocol multimedia subsystem of the communications network,
determining that the device is authorized to conduct the communications via the gateway, and
enabling the communications with the communications network via the gateway, wherein enabling the communications comprises initiating a network session between the gateway and the internet protocol multimedia subsystem of the communications network to allow access to the application, wherein the device accesses the application via the network session.

19. The gateway of claim 18, further comprising:
a router that communicates with the device using a wireless protocol, wherein the device communicates with the router using the wireless protocol, and wherein the cellular transceiver communicates wirelessly with the communications network using a cellular protocol.

20. The gateway of claim 18, wherein the network session comprises a session initiation protocol session, and wherein the application comprises an internet protocol multimedia subsystem application.

* * * * *